United States Patent
Gao et al.

(10) Patent No.: US 8,584,548 B2
(45) Date of Patent: Nov. 19, 2013

(54) ROBOT ARM ASSEMBLY WITH HARMONIC DRIVE

(75) Inventors: Dong-Wei Gao, Shenzhen (CN); Zhen-Xing Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 672 days.

(21) Appl. No.: 12/833,345

(22) Filed: Jul. 9, 2010

(65) Prior Publication Data
US 2011/0132129 A1 Jun. 9, 2011

(30) Foreign Application Priority Data
Dec. 4, 2009 (CN) .......................... 2009 1 0310914

(51) Int. Cl.
*B25J 17/00* (2006.01)
(52) U.S. Cl.
USPC .......................................... 74/490.04; 901/21
(58) Field of Classification Search
USPC ............... 74/490.04, 490.01, 490.03, 490.05; 901/21
See application file for complete search history.

(56) References Cited

U.S. PATENT DOCUMENTS

| 3,787,606 | A | * | 1/1974 | Schaeffer | 174/669 |
| 5,054,332 | A | * | 10/1991 | Terauchi et al. | 74/490.04 |
| 5,297,443 | A | * | 3/1994 | Wentz | 74/490.04 |
| 5,775,170 | A | * | 7/1998 | Genov et al. | 74/490.04 |
| 7,543,518 | B2 | * | 6/2009 | Buckingham et al. | 74/490.05 |
| 2007/0137370 | A1 | * | 6/2007 | Ichibangase et al. | 74/490.01 |
| 2008/0102999 | A1 | * | 5/2008 | Yang | 474/110 |

FOREIGN PATENT DOCUMENTS

CN 101116972 A 2/2008

* cited by examiner

*Primary Examiner* — Justin Krause
*Assistant Examiner* — Gregory Prather
(74) *Attorney, Agent, or Firm* — Altis & Wispro Law Group, Inc.

(57) ABSTRACT

A robot arm assembly includes a first link, a second link, and a joint rotatably connecting the first link and the second link. The joint includes an actuator mounted on the first link, a harmonic drive including a wave generator, a flex spline fitting over the wave generator, and a circular spline engaging the flex spline, and a belt drive between the actuator and the harmonic drive. The flex spline is fixed to the first link, the circular spline is fixed to the second link, and the belt drive transmits the rotational movement from the actuator to the wave generator.

16 Claims, 6 Drawing Sheets

ROBOT ARM ASSEMBLY WITH HARMONIC DRIVE

BACKGROUND

1. Technical Field

The present disclosure generally relates to robotic technologies, and particularly, to a robot arm assembly.

2. Description of Related Art

A commonly used robot arm includes a base anchored to the ground and a plurality of links arranged in series. The links of such a robot arm are connected by joints, thus allowing either rotational motion or translational displacement. The links adjacent to the base are commonly configured for bearing a substantial amount of load and have a relatively low velocity. When an electric motor is applied to supply power for driving such a link, a decelerator for providing engaging reduction ratio is needed. However, typically, such a decelerator utilizes a plurality of traditional multi-stage gear reducers, thereby resulting in a complex structure and a larger size. In addition, assembly and maintenance of the multi-stage gear reducers are inconvenient.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
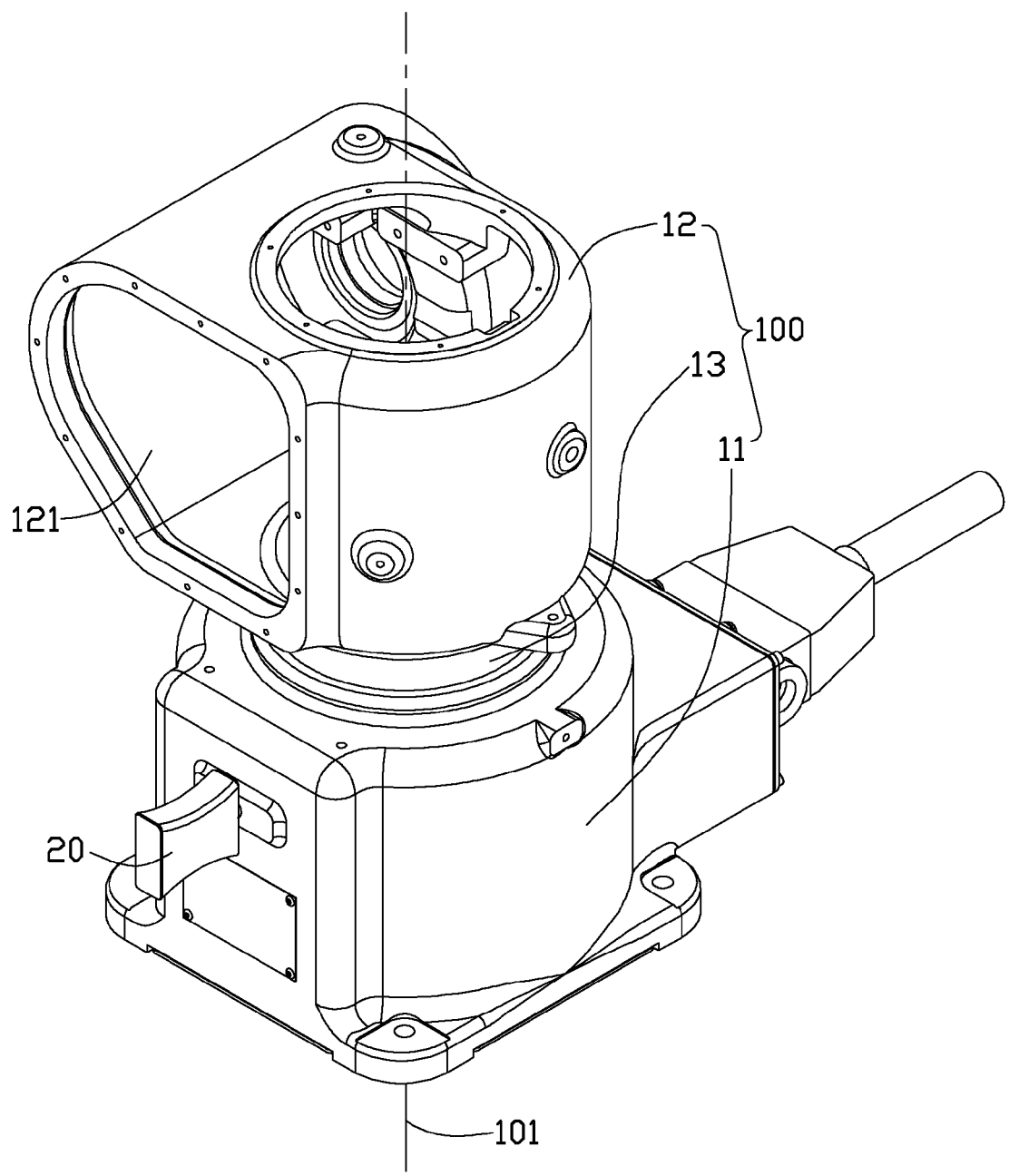
FIG. 1 is an isometric view of one embodiment of a robot arm assembly including a first link, a second link, and a joint rotatably connecting the first and second links.

Referring to FIG. 1, one embodiment of a robot arm assembly 100 according to the present disclosure includes a first link 11, a second link 12, and a joint 13 rotatably connecting the first link 11 and the second link 12. The second link 12 is rotatable relative to the first link 11 about a rotational axis 101. In this embodiment, the first link 12 can be used with a six-axis industrial robot and connected to a base thereof.

Figure 2:
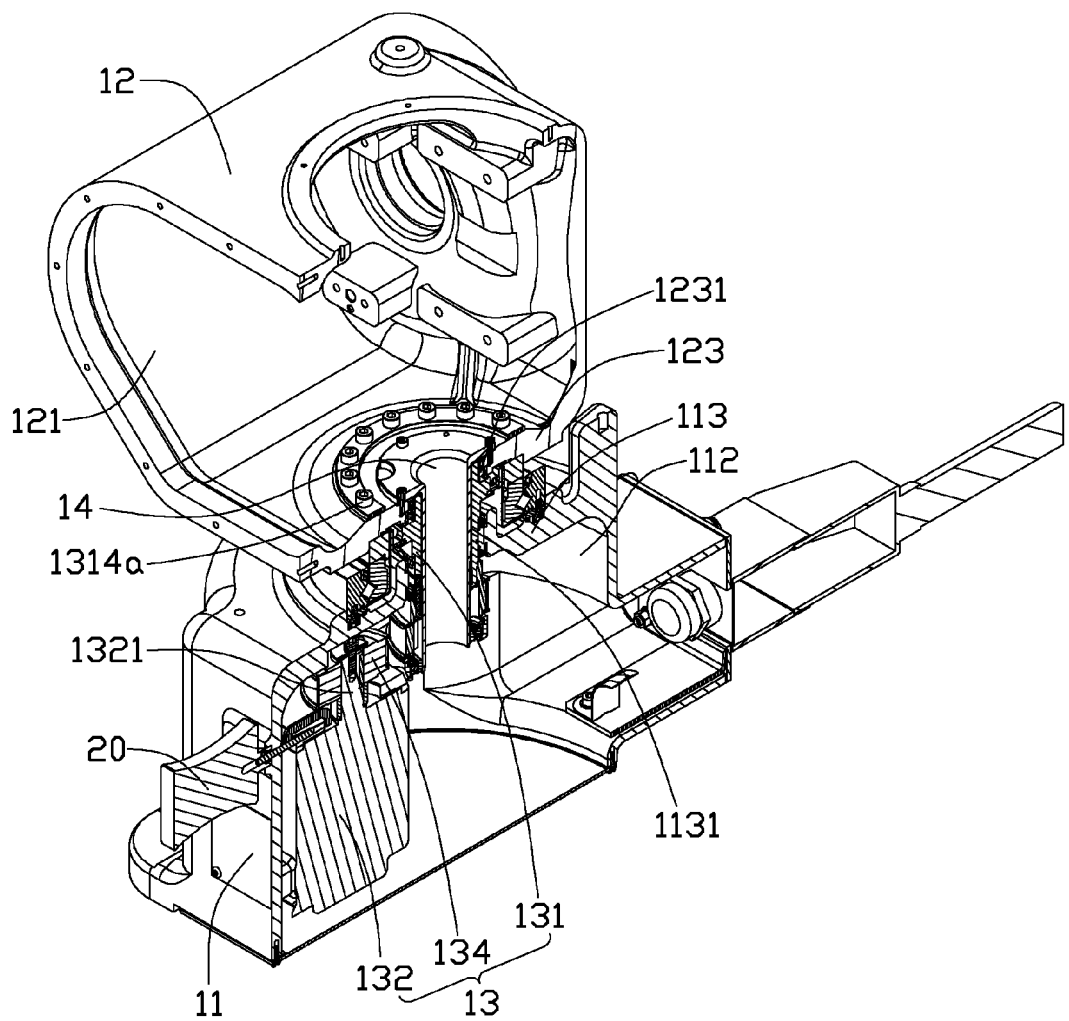
FIG. 2 is an isometric, cross-sectional view of the robot arm assembly of FIG. 1.

Referring to FIG. 2, the first link 11 defines a first hollow portion 112 and includes a first assembly wall 113 on the top. The second link 12 defines a second hollow portion 121 and includes a second assembly wall 123 on the bottom, which is facing the first assembly surface 113. The first assembly wall 113 defines a first assembly hole 1131, and the second assembly wall 123 defines a corresponding second assembly hole 1231 therein.

The joint 13 rotatably connects the first and second links 11, 12 and includes a harmonic drive 131, an actuator 132, and a belt drive 134.

Figure 3:
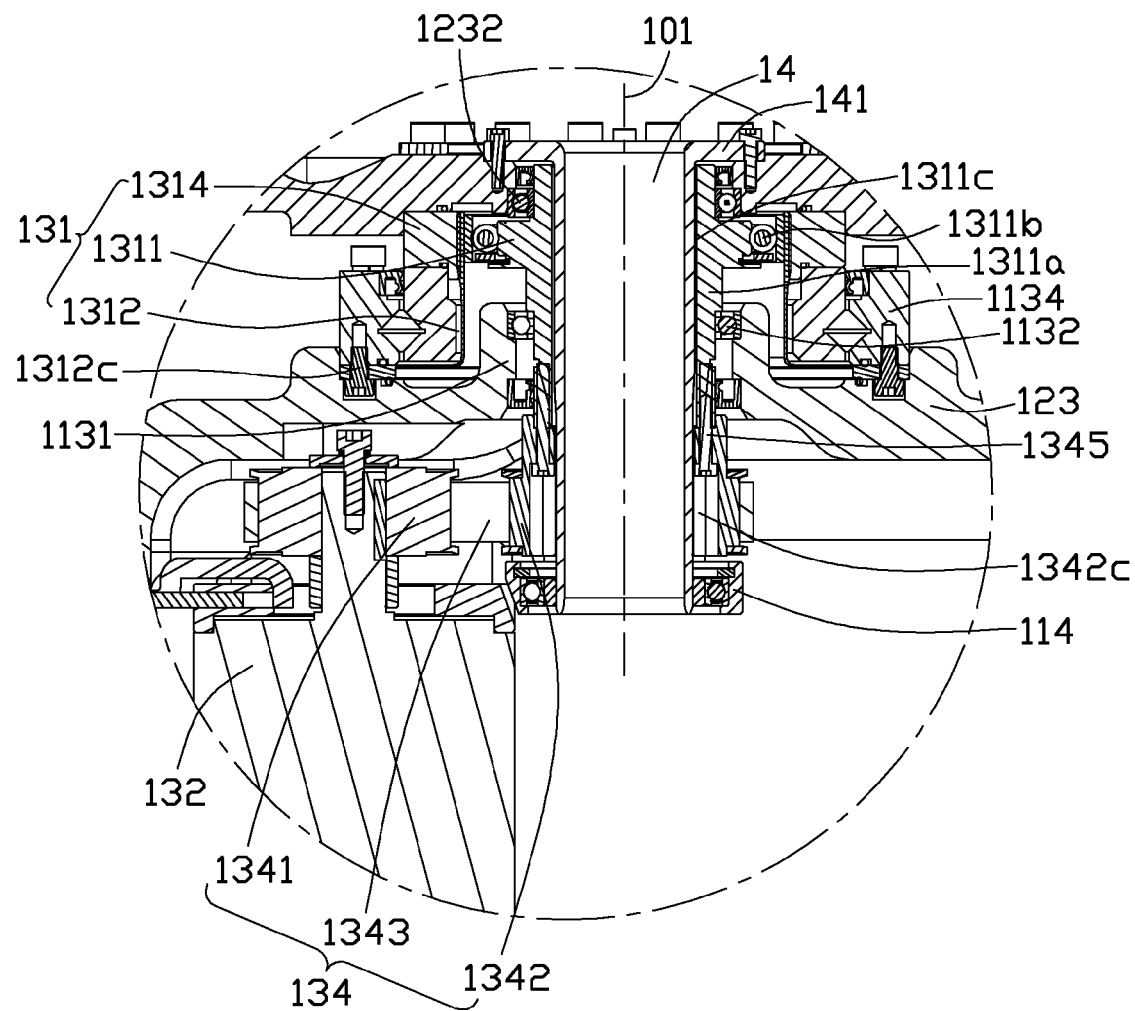
FIG. 3 is a partially enlarged view of the cross-sectional view of FIG. 2.
Figure 4:
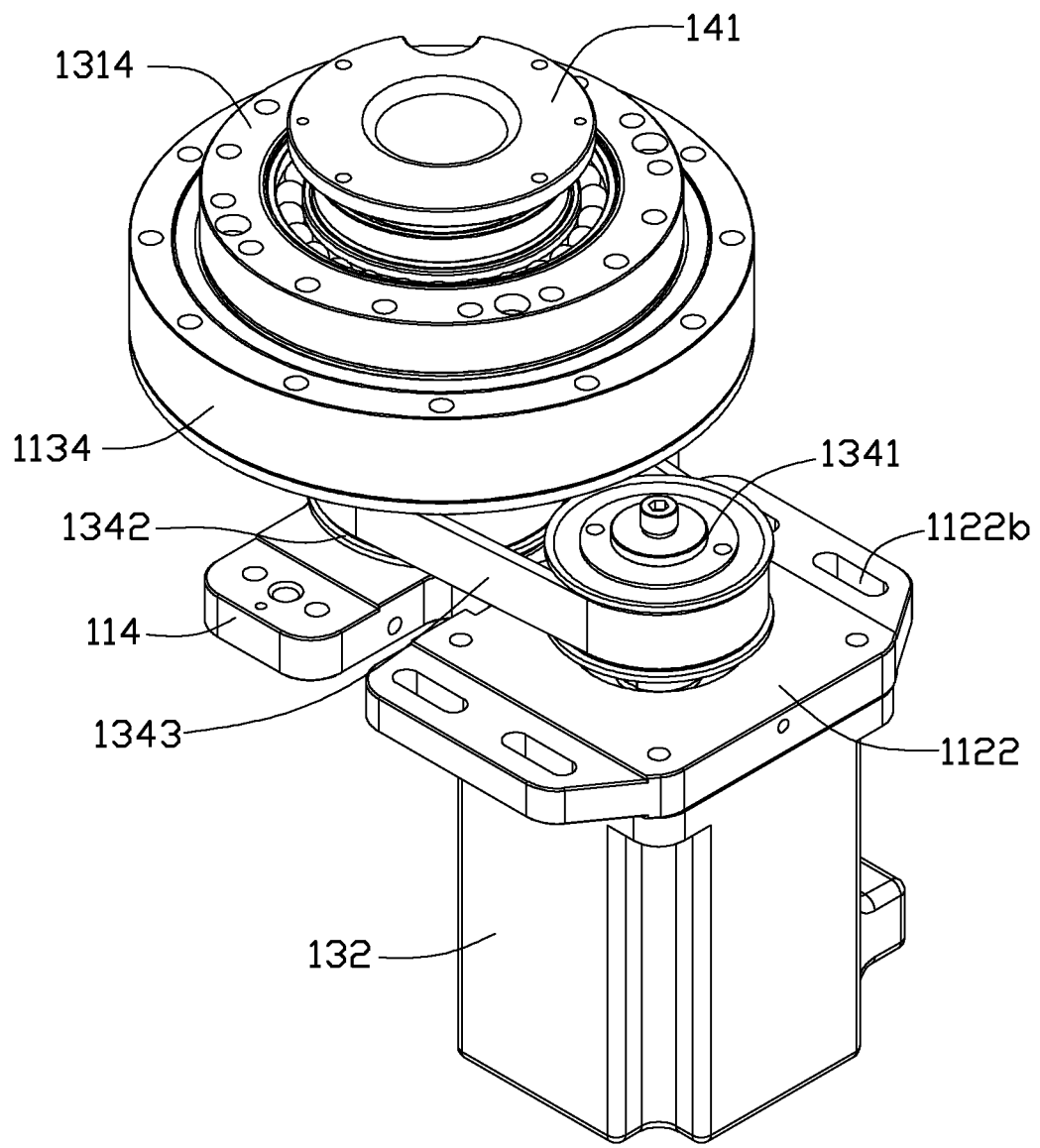
FIG. 4 is an assembled, isometric view of a joint used in the robot arm assembly of FIG. 1.
Figure 5:
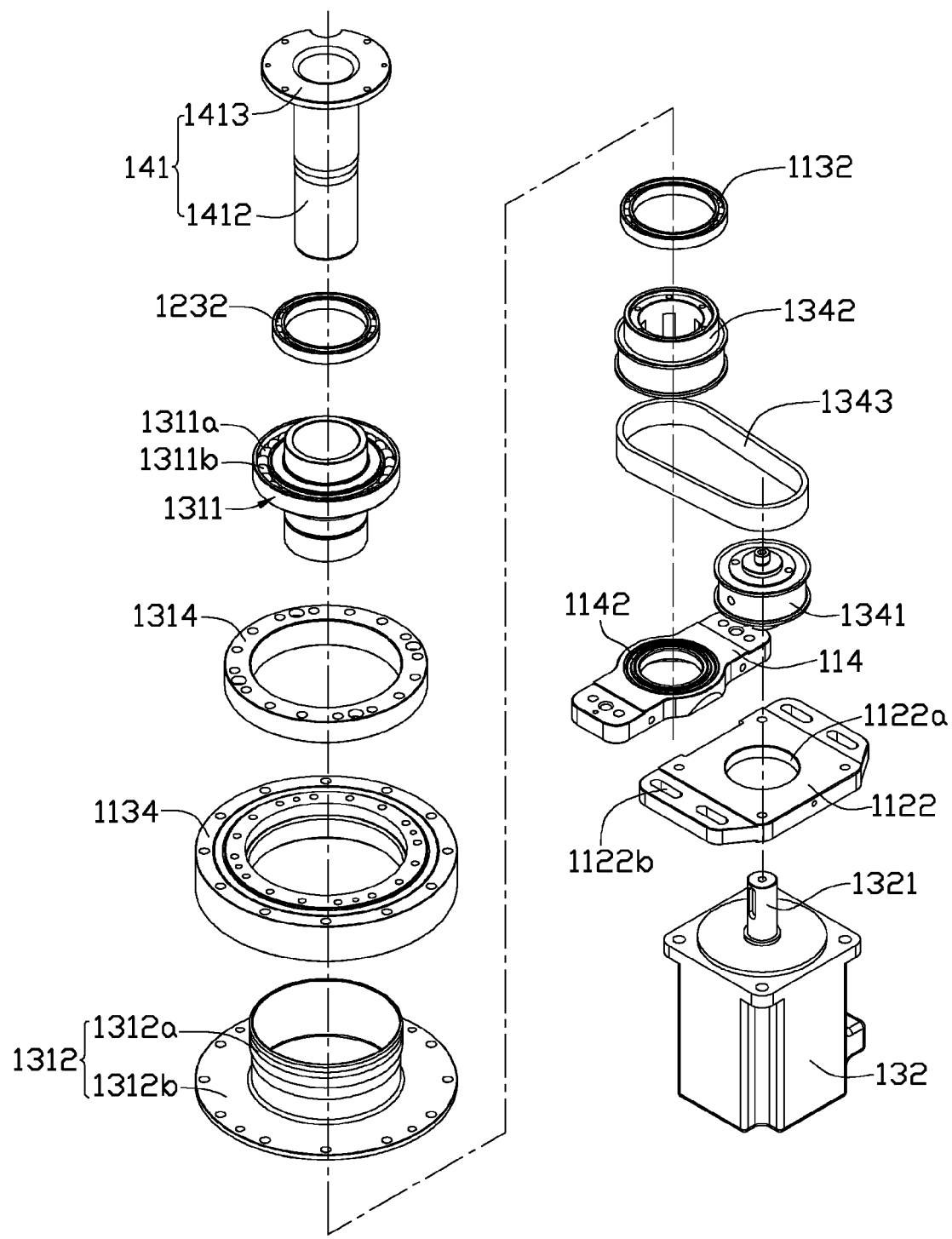
FIG. 5 is an exploded, isometric view of the joint of FIG. 4.
Figure 6:
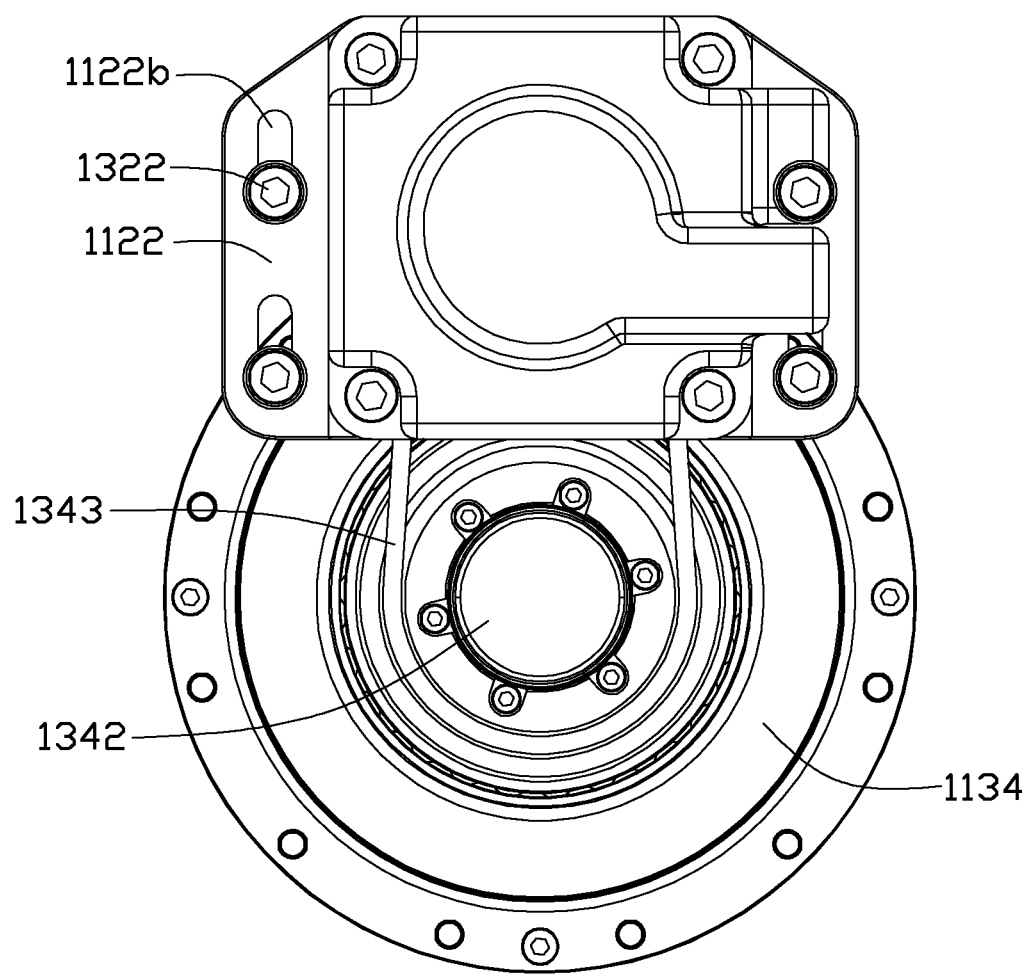
FIG. 6 is a bottom view of the joint of FIG. 4

Referring to FIGS. 3 and 5, the harmonic drive 131 can be a typical harmonic gear device and includes a wave generator 1311, a flex spline 1312 fitting over the wave generator 1311, and a circular spline 1314 engaging the flex spline 1312.

The wave generator 1311 includes a plug 1311a and a plurality of outer ball bearings 1311b around the plug 1311a. The plug 1311a can be an elliptical disk giving the bearings 1311b an elliptical arrangement as well.

The flex spline 1312 is provided with a deformable cylinder 1312a having a plurality of teeth (not shown) positioned radially around the outside thereof, and a connection portion 1312b radially extending from one end of the deformable cylinder 1312a. The sides of the cylinder 1312a are relatively thin, but the connection portion 1312b is relatively thick and rigid. The flex spline 1312 fits tightly over the wave generator 1311, so that when the plug 1311a rotates, the flex spline 1312 deforms to the shape of a rotating ellipse but does not rotate with the wave generator 1311.

The circular spline 1314 is a rigid circular ring having a plurality of teeth (not shown) on the inside. The flex spline 1312 and the wave generator 1311 are placed inside the circular spline 1314, thereby meshing the teeth of the flex spline 1312 and the circular spline 1314. Because the flex spline 1312 has an elliptical shape, its teeth only mesh with the teeth of the circular spline 1314 in two regions on opposite sides of the flex spline 1312, along the major axis of the ellipse. There are fewer teeth (for example two fewer) on the flex spline 1312 than there are on the circular spline 1314, so that for every full rotation of the wave generator 1311, the flex spline 1312 would be required to rotate a slight amount (two teeth, for example) backwards relative to the circular spline 1314. Thus, the rotation action of the wave generator 1311 results in a much slower rotation of the flex spline 1312 in the opposite direction, and a higher reduction ratio is thereby achieved.

The wave generator 1311 is rotatably received in the first and second assembly holes 1131, 1231, and coupled to a plurality of rolling bearings 1132, 1232 received in the first and second assembly holes 1131, 1231, respectively. The circular spline 1314 is fixed to the second assembly wall 123 by a plurality of fasteners 1314a. The connection portion 1312b of the flex spline 1312 is fixed to the first assembly wall 113 by a plurality of fasteners 1312c.

A cross roller bearing 1134 can be employed to connect the flex spline 1312 and the circular spline 1314. The inner ring of the cross roller bearing 1134 is fixed to the circular spline 1314, and the outer ring is fixed to the connection portion 1312b of the flex spline 1312, so that the circular spline 1314 can smoothly rotate relative to the flex spline 1312.

Referring to FIGS. 2 through 6, the actuator 132 can be a sever motor provided with an output shaft 1321. A connection flange 1122 is received in the first hollow portion 112 of the first link 11 to support the actuator 132. The connection flange 1122 defines a hole 1122a through which the output shaft 1321 passes through. The mounting surface of the actuator 132 adjacent to the output shaft 1321 is connected to the connection flange 1122 via a plurality of fasteners 1322.

The connection flange 1122 defines a plurality of slide grooves 1122b in which the fasteners 1322 are slidably received, thereby allowing the positions of the fasteners 1322 relative to the connection flange 1122 to be adjustable. When adjusting the position of the fasteners 1322 along the corresponding grooves 1122b, the position of the actuator 132 is accordingly adjusted to optimize the tightness of the belt drive 134.

In the illustrated embodiment, the belt drive 134 includes a first shaft 1341 connected to a second shaft 1342 by a belt 1343. The first shaft 1341 is fixed to the output shaft 1321 of the actuator 132, and the second shaft 1342 is fixed to the wave generator 1311 to rotate the wave generator 1311 about the rotational axis 101. The second shaft 1342 defines a plurality of first connection holes (not labeled) parallel to the rotational axis 101, and the wave generator 1311 defines a plurality of second connection holes (not labeled) corresponding to the first connection holes (not labeled). A plurality of fasteners 1345 is received in the first and second connection holes and threaded into the wave generator 1311 to fix the second shaft 1342 to the wave generator 1311. The belt drive 134 can be a synchronous belt drive, thus enabling more precise transmission.

A support base 114 is employed to support the second shaft 1342. The support base 114 is received in the first link 11, and is provided with a ball bearing 1142 mounted therein. An end of the second shaft 1342 is coupled to the ball bearing 1142.

A force gauge 20, for example, a digital force gauge which includes a carrying case, a flat display, and a plurality of hook adapters, can be supplied to detect the tension of the belt drive 134. In use, when the hook adapter of the tension gauge 20, which is connected to the actuator 132, pulls the force gauge 20, accordingly, the actuator 132 moves along the slide grooves 1122b, thereby adjusting the tightness of the belt drive 134. The value of the tension detected by the force gauge 20 is displayed on the flat display. As the tension exceeds a predetermined value, the external force is withdrawn and the actuator 132 is fixed in the current position via the fasteners 1322, so the tightness of the belt drive 143 can be predetermined.

Referring to FIGS. 3 and 5 again, the second shaft 1342 defines a first passage 1342c, and the wave generator 1311 defines a second passage 1311c communicating with the first passage 1342c. The first and second passages 1342c, 1311c cooperatively define a conduit 14 for the wires and/or cables, which can be drawn from the first hollow portion 112 of the first link 11 to the second hollow portion 121 of the second link 12 via the conduit 14, thus protecting the wires and/or cables from damage. In the illustrated embodiment, the conduit 14 extends along the rotational axis 101.

A sleeve 141 is received in the conduit 14, through which the wires and/or cables can be passed through. The sleeve 141 includes a tube 1412 and a rim 1413 radially extending from the circumference of the tube 1412. The tube 1412 is received in the conduit 14, and the rim 1413 is fixed to the second assembly wall 123 via a plurality of fasteners (not labeled). The sleeve 141 can be made of soft materials, such as, for example, rubber, and has a smooth inner surface, thus decreasing abrasion when the wires and/or cables are moved relative to the sleeve 141. The end of the sleeve 141 away from the rim 1413, extending out of the conduit 14, is received in the support base 114.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robot arm assembly comprising a first link rotatably connected to a second link by a joint, comprising:
   an actuator mounted in the first link;
   a harmonic drive for rotating the second link, the harmonic drive comprising a wave generator, a flex spline, and a circular spline, the flex spline fitting over the wave generator, and the circular spline engaging the flex spline, the flex spline being fixed to the first link, the circular spline being fixed to the second link;
   a belt drive between the actuator and the harmonic drive, and defining a first passage;
   a support base received in the first link and employed to support the belt drive, the support base provided with a bearing mounted therein; and
   a sleeve extending through the first and the second link;
   wherein the belt drive transmits the rotational movement from the actuator to the wave generator, the wave generator defines a second passage communicating with the first passage of the belt drive, the first and second passages cooperatively define a conduit, the sleeve comprises a tube and a rim radially extending from the tube, the rim is fixed to the second link, the tube is received in the conduit, and an end of the tube away from the rim extends out of the conduit and is rotatably received in the support base via the bearing.

2. The robot arm assembly of claim 1, wherein the belt drive comprises a first shaft connected to the actuator, a second shaft connected to the wave generator to rotate the wave generator, and a belt connecting the first and second shafts.

3. The robot arm assembly of claim 2, the belt drive is a synchronous belt drive.

4. The robot arm assembly of claim 1, wherein a second shaft defines the first passage.

5. The robot arm assembly of claim 4, wherein the conduit extends along a rotational axis of the wave generator.

6. The robot arm assembly of claim 5, wherein the sleeve is made of rubber.

7. The robot arm assembly of claim 5, wherein the support base supports the second shaft, and the end of the tube of the sleeve extends through the support base.

8. The robot arm assembly of claim 2, further comprising a connection flange received in the first link, and the actuator being mounted on the connection flange and movable relative to the connection flange thereto.

9. The robot arm assembly of claim 8, wherein the connection flange defines a slide groove, the robot arm assembly further comprises a plurality of fasteners to connect the connection flange and the actuator, the fastener is moveably received in the slide groove and fixed to the actuator to adjust the tightness of the belt drive.

10. A robot arm assembly, comprising:
    a first link,
    a second link,
    a joint rotatably connecting the first link and the second link;
    a support base received in the first link and provided with a bearing mounted therein;
    a sleeve extending through the first and the second link; and
    a force gauge, wherein the joint comprises an actuator movably fixed on the first link; a harmonic drive comprising a wave generator, a flex spline fitting over the wave generator, and a circular spline engaging the flex spline; and a belt drive between the actuator and the harmonic drive; the flex spline is fixed to the first link, the circular spline is fixed to the second link, the belt drive transmits rotation movement from the actuator to the wave generator, and the force gauge is connected to the actuator to detect the tension of the belt drive, the belt drive defines a first passage, the wave generator defines a second passage communicating with the first passage of the belt drive, the first and second passages cooperatively define a conduit, the support base supports the belt drive, the sleeve comprises a tube and a rim radially extending from the tube, the rim is fixed to the second link, the tube is received in the conduit, and an end of the tube away from the rim extends out of the conduit and is rotatably received in the support base via the bearing.

11. The robot arm assembly of claim 10, further comprising a connection flange received in the first link, the actuator being mounted on the connection flange and movable relative to the connection flange thereto.

12. The robot arm assembly of claim 11, wherein the connection flange defines a slide groove, the robot arm assembly further comprises a plurality of fasteners to connect the connection flange and the actuator, and the fastener is moveably received in the slide groove and fixed to the actuator to adjust the position of the actuator relative to the connection flange, thus adjusting the tightness of the belt drive.

13. The robot arm assembly of claim 10, wherein the belt drive comprises a first shaft connected to the actuator, a second shaft connected to the wave generator to rotate the wave generator, and a belt connecting the first and second shafts.

14. The robot arm assembly of claim 13, wherein the second shaft defines the first passage.

15. The robot arm assembly of claim 14, wherein the conduit extends along a rotational axis of the wave generator.

16. The robot arm assembly of claim 14, wherein the sleeve is made of rubber.

* * * * *